United States Patent [19]
Drake et al.

[11] Patent Number: 5,976,356
[45] Date of Patent: Nov. 2, 1999

[54] ACID TREATED ZEOLITE CONTAINING BORON AND SILVER USED AS A CATALYST FOR CONVERTING HYDROCARBONS AND A METHOD OF MAKING AND USING SUCH CATALYST

[75] Inventors: Charles A. Drake, Nowata; Jianhua Yao, Bartlesville, both of Okla.

[73] Assignee: Phillips Petroleum Company, Bartlesville, Okla.

[21] Appl. No.: 08/967,844

[22] Filed: Nov. 12, 1997

[51] Int. Cl.$^6$ .................................................. C10G 35/095
[52] U.S. Cl. ......................... 208/135; 585/418; 585/475; 585/486; 585/643; 585/661; 585/670; 502/60; 502/63; 502/64; 502/71; 502/77; 502/85
[58] Field of Search .................................. 502/60, 63, 64, 502/73, 77, 85, 71; 208/135; 585/418, 486, 475, 661, 670, 643

[56] References Cited

U.S. PATENT DOCUMENTS

| | | | |
|---|---|---|---|
| 4,276,438 | 6/1981 | Chu | 585/467 |
| 4,452,907 | 6/1984 | Ball et al. | 502/60 |
| 4,499,318 | 2/1985 | Liu | 585/438 |
| 4,608,355 | 8/1986 | Chu | 502/68 |
| 4,845,063 | 7/1989 | Chu | 502/60 |

*Primary Examiner*—Thomas Dunn
*Attorney, Agent, or Firm*—Reece A. Scott; Charles W. Stewart

[57] ABSTRACT

A novel zeolite catalyst comprising an acid treated zeolite impregnated with silver and boron, a method of making such zeolite catalyst, and the use thereof for converting paraffin hydrocarbons to olefins and aromatics.

24 Claims, No Drawings

ACID TREATED ZEOLITE CONTAINING BORON AND SILVER USED AS A CATALYST FOR CONVERTING HYDROCARBONS AND A METHOD OF MAKING AND USING SUCH CATALYST

BACKGROUND OF THE INVENTION

The invention relates to an improved process for converting non-aromatic hydrocarbons in the presence of an improved zeolite material to aromatic and lower olefin hydrocarbons during the conversion of such hydrocarbons in the presence of such improved zeolite material.

It is known to catalytically crack non-aromatic gasoline boiling range hydrocarbons (in particular paraffins and olefins) to lower olefins (such as ethylene and propylene) and aromatic hydrocarbons (such as benzene, toluene, and xylenes) in the presence of catalysts which contain a zeolite (such as ZSM-5), as is described in an article by N. Y. Chen et al in Industrial & Engineering Chemistry Process Design and Development, Volume 25, 1986, pages 151–155. The reaction product of this catalytic cracking process contains a multitude of hydrocarbons such as unconverted $C_5$+alkanes, lower alkanes (methane, ethane, propane), lower alkenes (ethylene and propylene), $C_6$–$C_8$ aromatic hydrocarbons (benzene, toluene, xylenes, and ethylbenzene), and $C_9$+aromatic hydrocarbons. Depending upon the relative market prices of the individual reaction products, it can be desirable to increase the yield of certain of the more valuable products relative to the others.

SUMMARY OF THE INVENTION

It is an object of this invention to at least partially convert hydrocarbons to ethylene, propylene and BTX (benzene, toluene, xylene and ethylbenzene) aromatics.

A further object of this invention is to provide an improved zeolite material that gives an improved yield of lower olefins and BTX aromatics when utilized in the conversion of hydrocarbons.

A yet further object of this invention is to provide hydrocarbon conversion processes which produce a conversion product containing suitable quantities of olefins and BTX aromatics.

Another further object of this invention is to provide a method for making an improved zeolite material having such desirable properties as favorable production of olefins and BTX aromatics when used in the conversion of hydrocarbons.

The invention includes a novel catalyst composition for use in converting hydrocarbons. This novel catalyst composition comprises an acid treated zeolite impregnated with silver and boron and is prepared by incorporating silver and boron into an acid treated zeolite material. The inventive process provides for the conversion of non-aromatic hydrocarbons to aromatic hydrocarbons and lower olefins by contacting under conversion conditions a hydrocarbon feed with an acid treated zeolite impregnated with silver and boron.

Other objects and advantages of the invention will become apparent from the detailed description and the appended claims.

DETAILED DESCRIPTION OF THE INVENTION

The inventive composition includes a zeolite starting material that has been treated with an acid to thereby provide an acid treated zeolite. The inventive composition further contains silver and boron. One of the important aspects of the invention is the requirement that the composition be promoted with both silver and boron. A further important aspect of the inventive composition is for the starting zeolite material, which is being modified to provide the inventive composition having the desirable properties as earlier described herein, to be treated with an acid to give an acid treated zeolite. The acid treated zeolite is further modified by the incorporation of the two metal promoters of silver and boron.

Any suitable means or method may be used to treat the zeolite starting material with acid. It is preferred for the zeolite to be soaked with an acid solution by any suitable means known in the art for contacting the zeolite with such acid solution. The acid solution used to treat the zeolite can be a solution of any acid that suitably provides for the leaching of aluminum atoms from the zeolite particles. Preferably, the acid concentration in this solution is about 1–10 equivalents per liter. Examples of such suitable acids include sulfuric, phosphoric, nitric and hydrochloric. The preferred acid solution is aqueous hydrochloric acid. The zeolite is soaked in the acid solution for a period upwardly to about 15 hours, but, preferably from 0.1 hour to 12 hours, at a temperature in the range of from about 10° C. to about 100° C., preferably from or about 50° C. to or about 99° C. After soaking, the resultant acid treated zeolite is washed free of the acid and then can be dried or calcined, or both.

The zeolite starting material used in the composition of the invention can be any zeolite which is effective in the conversion of non-aromatics to aromatics when contacted under suitable reaction conditions with non-aromatic hydrocarbons. Preferably, the zeolite has a constraint index (as defined in U.S. Pat. No. 4,097,367, which is incorporated herein by reference) in the range of from or about 0.4 to or about 12, preferably from or about 2 to or about 9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is in the range of from or about 8:1 to or about 200:1, more preferably from or about 12:1 to or about 100:1. Preferred zeolites include ZSM-5, ZSM-8, ZSM-11, ZSM-12, ZSM-35, ZSM-38, and mixtures thereof. Some of these zeolites are also known as "MFI" or "Pentasil" zeolites. The presently more preferred zeolite is ZSM-5.

The inventive composition further includes, in addition to the acid leached zeolite, silver and boron. These metals may be incorporated into the acid leached zeolite by any suitable means or method known in the art for incorporating metallic elements into a substrate material. A preferred method is the use of any standard incipient wetness technique for impregnating the acid leached zeolite substrate with the metal promoters. The preferred method uses a liquid impregnation solution containing the desirable concentration of silver or boron, or both, so as to ultimately provide the final inventive composition having the required concentration of metals.

It is particularly desirable to use for the impregnation of the acid treated zeolite aqueous solutions of silver or boron, or both. The acid treated zeolite may be impregnated with the silver and boron simultaneously or sequentially. The preferred impregnation solutions include an aqueous solution formed by dissolving a silver containing compound in water to form a silver containing impregnation solution and a boron containing compound in water to form a boron containing impregnation solution. It is most preferred for the acid treated zeolite to first be impregnated with silver followed by a second impregnation with boron. The first impregnation solution most preferably contains a first salt of silver, for example, silver nitrate, and the second impregnation solution most preferably contains boric acid.

The amounts of the silver and boron incorporated or impregnated into the acid treated zeolite should be such as to give concentrations effective in providing the desirable properties of favorable aromatics and olefin conversion yields when the inventive composition is employed in the conversion of a hydrocarbon feed. Generally, the atomic ratio of the silver to boron in the impregnated acid treated zeolite is in the range of from about 0.1:1 to about 10:1. A preferred atomic ratio of silver to boron in the impregnated acid treated zeolite is in the range of from about 0.2:1 to about 5:1 and, most preferably, the atomic ratio is in the range of from 0.5:1 to 3:1.

The weight percent of silver present in the impregnated acid treated zeolite is generally in the range upwardly to about 10 weight percent of the impregnated acid treated zeolite. The preferred concentration of silver in the impregnated acid treated zeolite is in the range of from about 0.05 to about 8 weight percent and, most preferably, from 0.1 to 6 weight percent. The boron component should generally be present in the impregnated acid treated zeolite in the range upwardly to about 15 weight percent of the impregnated acid treated zeolite. Preferably, the concentration of boron is in the range of from about 0.1 to about 12 weight percent and, most preferably, from 0.2 to 10 weight percent.

The inventive compositions described herein can also contain an inorganic binder (also called matrix material) preferably selected from the group consisting of alumina, silica, alumina-silica, aluminum phosphate, clays (such as bentonite), and mixtures thereof. The content of the impregnated acid treated zeolite component of the mixture of impregnated acid treated zeolite and inorganic binder is about 1–99 (preferably about 5–80) weight-%, and the content of the above-listed inorganic binders in the mixture of impregnated acid treated zeolite and inorganic binder is about 1–50 weight-%. Generally, the impregnated acid treated zeolite and inorganic binder components are compounded and subsequently shaped (such as by pelletizing, extruding or tableting). Generally, the surface area of the compounded composition is about 50–700 $m^2/g$, and its particle size is about 1–10 mm.

The impregnated acid treated zeolite can be subjected to a steam treatment step whereby it is exposed by any suitable method known in the art to an atmosphere of steam under temperature and pressure conditions and for a period of time that suitably provide a steam treated material. Generally, the steam treatment may be conducted at a pressure from below atmospheric upwardly to about 3000 psia. More typical pressures, however, are in the range of from about atmospheric to about 2500 psia, preferably, from 15 psia to 800 psia. The steam treatment temperature is generally in the range of from about 100° C. to about 1500° C. Preferably, this temperature range is from about 200° C. to about 1300° C. and, most preferably, the second heat treatment temperature is in the range of from 400° C. to 1200° C. It is preferred for the steam to be superheated and not saturated.

The time period for conducting the steam treatment step must be sufficient to provide a steam treated material having the desirable properties of good catalytic activity and resistance to coke formation. Generally, the period for exposing the impregnated acid treated zeolite to the steam atmosphere at the appropriate temperature and pressure conditions can be in the range of from about 0.1 hour to about 20 hours. Preferably, the steam treatment step is conducted for a period of from about 0.25 hour to about 18 hours and, most preferably, from 0.5 hour to 15 hours.

Any suitable hydrocarbon feedstock which comprises paraffins (alkanes) and/or olefins (alkenes) and/or naphthenes (cycloalkanes), wherein each of these hydrocarbons contains 2–16 carbon atoms per molecule can be used as the feed to be contacted with the inventive compositions under suitable process conditions for obtaining a reaction product comprising lower alkenes containing 2 to 5 carbon atoms per molecule and aromatic hydrocarbons. Frequently, these feedstocks also contain aromatic hydrocarbons. Non-limiting examples of suitable, available feedstocks include gasolines from catalytic oil cracking (e.g., FCC and hydrocracking) processes, pyrolysis gasolines from thermal hydrocarbon (e.g., ethane, propane, and naphtha) cracking processes, naphthas, gas oils, reformates, straight-run gasoline and the like. The preferred feed is a gasoline-boiling range hydrocarbon feedstock suitable for use as at least a gasoline blend stock generally having a boiling range of about 30–210° C. Generally, the content of paraffins exceeds the combined content of olefins, naphthenes and aromatics (if present).

The hydrocarbon feed stream can be contacted by any suitable manner with the inventive compositions described herein contained within a reaction zone. The contacting step can be operated as a batch process step or, preferably, as a continuous process step. In the latter operation, a solid catalyst bed or a moving catalyst bed or a fluidized catalyst bed can be employed. Any of these operational modes have advantages and disadvantages, and those skilled in the art can select the one most suitable for a particular feed and catalyst.

The contacting step is preferably carried out within a conversion reaction zone, wherein is contained the inventive composition, and under reaction conditions that suitably promote the formation of olefins, preferably light olefins, and aromatics, preferably BTX, from at least a portion of the hydrocarbons of the hydrocarbon feed. The reaction temperature of the contacting step is more particularly in the range of from about 400° C. to about 800° C., preferably, from about 450° C. to about 750° C. and, most preferably, from 500° C. to 700° C. The contacting pressure can range from subatmospheric pressure upwardly to about 500 psia, preferably, from about atmospheric to about to about 450 psia and, most preferably, from 20 psia to 400 psia.

The flow rate at which the hydrocarbon feed is charged to the conversion reaction zone is such as to provide a weight hourly space velocity ("WHSV") in the range of from exceeding 0 $hour^{-1}$ upwardly to about 1000 $hour^{-1}$. The term "weight hourly space velocity", as used herein, shall mean the numerical ratio of the rate at which a hydrocarbon feed is charged to the conversion reaction zone in pounds per hour divided by the pounds of catalyst contained in the conversion reaction zone to which the hydrocarbon is charged. The preferred WHSV of the feed to the conversion reaction zone or contacting zone can be in the range of from about 0.25 $hour^{-1}$ to about 250 $hour^{-1}$ and, most preferably, from 0.5 $hour^{-1}$ to 100 $hour^{-1}$.

The following examples are presented to further illustrate this invention and are not to be construed as unduly limiting its scope.

EXAMPLE I

This example illustrates the preparation of several catalysts which were subsequently tested as catalysts in the conversion of a gasoline sample, which had been produced in a commercial fluidized catalytic cracking unit (FCC), to aromatics.

Acid Leached Zeolite

A commercially available ZSM-5 catalyst (provided by United Catalysts Inc., Louisville, Ky., under product designation "T-4480" was treated by acid leaching. To acid leach the catalyst, it was soaked in an aqueous HCl solution, having a concentration of approximately 20 weight percent HCl (approximately 6N), for two hours at a constant temperature of about 90° C. After soaking, the catalyst was separated from the acid solution and thoroughly washed with water and dried. The acid soaked, washed and dried catalyst was calcined at a temperature of about 525° C. for four hours.

Catalyst A 5 g of acid leached ZSM-5 zeolite (described above) was treated with steam (flow rate: 6.8 ml/hr $H_2O$) at 650° C. for 6 hours.

Catalyst B 20 ml $H_2O$ was added to 10 g of acid leached ZSM-5 zeolite (described above) and heated to about 50° C. in a water bath. To this system, a solution of 0.23 g of boric acid dissolved in 10 ml $H_2O$ was added. The mixture was then heated to dryness on a hot plate and further dried to 120° C. for 3 hours and calcined at 520 ° C. for 3 hours. The boron impregnated, acid leached ZSM-5 zeolite was steam-treated in accordance with the procedure described for Catalyst A.

Catalyst C 10 g of acid leached ZSM-5 zeolite (described above) was soaked in an aqueous solution containing 0.32 g $AgNO_3$ dissolved in 16 ml $H_2O$ at room temperature for about 2 hours. The mixture was then heated to dryness on a hot plate and further dried at 120° C. for 3 hours and calcined at 520° C. for 3 hours. the resulting silver impregnated, acid leached ZSM-5 zeolite was steam-treated in accordance with the procedure described for Catalyst A.

Catalyst D 10 g of acid leached ZSM-5 zeolite (described above) was soaked in an aqueous solution containing 0.32 g $AgNO_3$ dissolved in 20 ml $H_2O$ at room temperature for about 2 hours and then heated to 50° C. in a water bath. To this system, a solution of 0.23 g of boric acid dissolved in 10 ml $H_2O$ was added. The mixture was then heated to dryness on a hot plate and further dried at 120° C. for 3 hours and calcined at 520° C. for 3 hours. The silver and boron impregnated, acid leached ZSM-5 zeolite was steam-treated in accordance with the procedure described for Catalyst A.

EXAMPLE II

This example illustrates the use of the zeolite materials described in Example I as catalysts in the conversion of a gasoline feed to benzene, toluene and xylenes (BTX) and lower olefins (ethylene, propylene).

For each of the test runs, a 4.4 g sample of the catalyst materials described in Example I was placed into a stainless steel tube reactor (length: about 18 inches; inner diameter: about 0.5 inch). Gasoline boiling range feedstock from a catalytic cracking unit of a refinery was passed through the reactor at a flow rate of about 12 ml/hour, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Results of four test runs for Catalysts A through D are summarized in Table I. All test data were obtained after 6 hours on stream.

TABLE I

| Catalyst | BTX Yield | Light Olefin Yield* | Sum of BTX and olefin |
|---|---|---|---|
| A | 25.7 | 25.2 | 50.9 |
| B | 25.9 | 24.7 | 50.6 |
| C | 33.3 | 21.6 | 54.9 |
| D (Invention) | 29.4 | 24.9 | 54.3 |

*Ethylene + Propylene

The test data presented in Table I show that the inventive Catalyst D has a significantly higher BTX yield and total BTX and olefin yield than comparative Catalysts A and B. A comparison of inventive Catalyst D with comparative Catalyst C indicates a comparable total BTX and olefin yield with a significantly higher light olefin yield. These benefits are unexpected and are believed to be due to the synergistic effects of the silver and boron components.

Reasonable variations, modifications, and adaptations can be made within the scope of the disclosure and the appended claims without departing from the scope of this invention.

That which is claimed is:

1. A catalyst composition for use in converting hydrocarbons, said composition consists essentially of:
    an acid treated ZSM-5 impregnated with silver and boron to thereby form an impregnated acid treated zeolite wherein said impregnated acid treated zeolite has undergone a heat treatment whereby said impregnated acid treated zeolite is contacted with steam under high temperature conditions to thereby provide a steam treated material and further wherein said heat treatment is conducted at a temperature in the range of from about 400° C. to about 1200° C. and for a time period of from about 0.1 hour to about 12 hours.

2. A composition as recited in claim 1 wherein the silver present in said impregnated acid treated ZSM-5 is in the range upwardly to about 10 weight percent of said impregnated acid treated ZSM-5 and said boron present in said impregnated acid treated ZSM-5 is in the range upwardly to about 15 weight percent.

3. A composition as recited in claim 2 wherein the atomic ratio of silver to boron in said impregnated acid treated ZSM-5 is in the range of from about 0.1:1 to about 10:1.

4. A composition as recited in claim 3 wherein the impregnation of said acid treated ZSM-5 includes contacting said acid treated ZSM-5 with a first solution containing a first salt of said silver and a second solution containing a boron containing compound.

5. A composition as recited in claim 1 wherein the silver present in said impregnated acid treated ZSM-5 is in the range from about 0.05 to about 8 weight percent of said impregnated acid treated ZSM-5 and said boron is present in said impregnated acid treated ZSM-5 is in the range from about 0.1 to about 12 weight percent.

6. A composition as recited in claim 5 wherein the atomic ratio of silver to boron in said impregnated acid treated ZSM-5 is in the range of from about 0.2:1 to about 5:1 weight percent.

7. A composition as recited in claim 1 wherein the silver present in said impregnated acid treated ZSM-5 is in the range from 0.1 to 6 weight percent of said impregnated acid treated ZSM-5 and said boron is present in said impregnated acid treated ZSM-5 is in the range from 0.2 to 10 weight percent of said impregnated acid treated zeolite.

8. A composition as recited in claim 7 wherein the atomic ratio of silver to boron in said impregnated acid treated ZSM-5 is in the range of from 0.5:1 to 3:1.

9. A method of making a catalyst for use in converting hydrocarbons, said method comprises:

incorporating silver and boron into an acid treated zeolite thereby providing an impregnated acid treated zeolite and steam treating said impregnated acid treated zeolite by contacting said impregnated acid treated zeolite with steam under high temperature conditions to thereby provide a steam treated material wherein said silver is present in said impregnated acid treated zeolite in the range upwardly to about 10 weight percent and said boron is present in said impregnated acid treated zeolite in the range upwardly to about 15 weight percent and further wherein the atomic ratio of silver to boron incorporated into said acid treated zeolite is in the range of from about 0.1:1 to about 10:1.

10. A method as recited in claim 9 wherein the silver present in said impregnated acid treated zeolite is in the range of from about 0.05 to about 8 weight percent of said impregnated acid treated zeolite and said boron present in said impregnated acid treated zeolite is in the range of from about 0.1 to about 12 weight percent.

11. A method as recited in claim 10 wherein the atomic ratio of silver to boron incorporated into said acid treated zeolite is in the range of from about 0.2:1 to about 5:1.

12. A method as recited in claim 9 wherein the silver present in said impregnated acid treated zeolite is in the range of from about 0.1 to about 6 weight percent of said impregnated acid treated zeolite and said boron is present in said impregnated acid treated zeolite is in the range of from about 0.2 to about 10 weight percent of said impregnated acid treated zeolite.

13. A method as recited in claim 12 wherein the atomic ratio of silver to boron incorporated into said acid treated zeolite is in the range of from about 0.5:1 to about 3:1.

14. A method as recited in claim 9 wherein the steam treating temperature is in the range of from about 400° C. to about 1200° C. and the steam treating is conducted for a time period of from about 0.1 hour to about 12 hours.

15. A composition prepared by the method of claim 10.

16. A composition prepared by the method of claim 11.

17. A composition prepared by the method of claim 12.

18. A composition prepared by the method of claim 13.

19. A composition prepared by the method of claim 14.

20. A composition prepared by the method of claim 9.

21. A process comprising contacting under conversion conditions a hydrocarbon feed with the composition of claims 1, 2, 3, 5, 6, 7, 8, 4, 20, 15, 16, 17, 18, or 19 wherein a conversion product includes aromatics and olefins.

22. A process as recited in claim 21 wherein said hydrocarbon feed comprises hydrocarbons containing 2–16 carbon atoms per molecule.

23. A process as recited in claim 22 wherein said conversion conditions include a reaction temperature in the range of from about 400° C. to about 800° C. and a contacting pressure in the range of from subatmospheric pressure upwardly to about 500 psia.

24. A process as recited in claim 23 wherein said conversion conditions further include a charge rate of said hydrocarbon feed such that the weight hourly space velocity is in the range of from exceeding 0 $hour^{-1}$ upwardly to about 1000 $hour^{-1}$.

* * * * *